No. 658,088.  
S. JONES.  
APPARATUS FOR MOLDING GLASS PIPES.  
(Application filed Dec. 16, 1899.)  
Patented Sept. 18, 1900.
(No Model.)
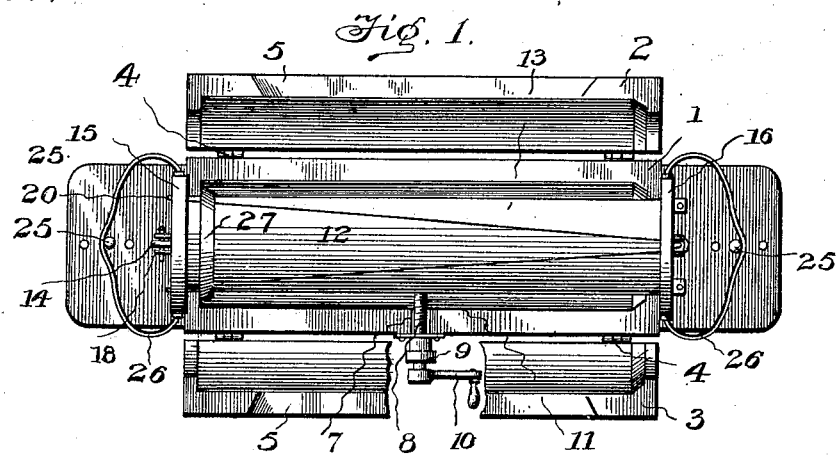
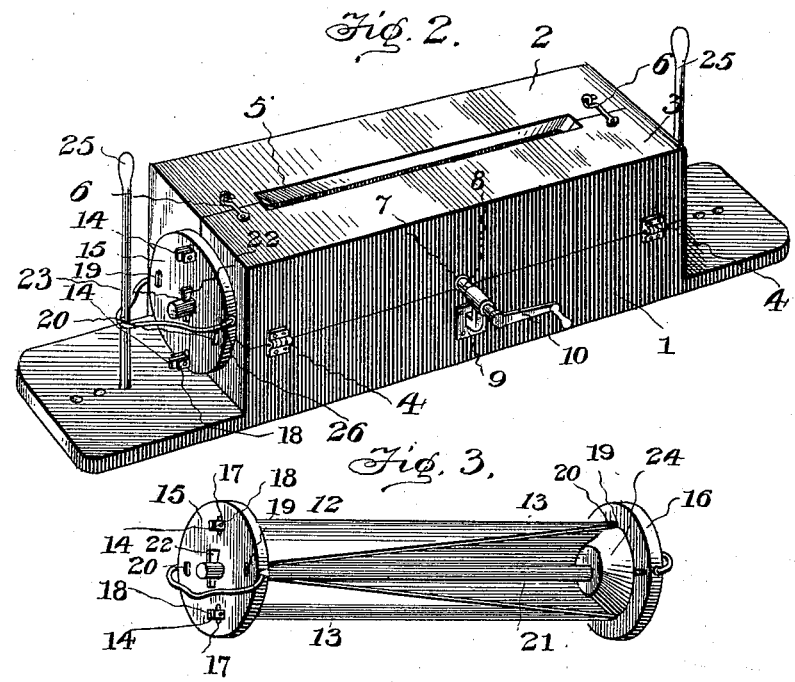
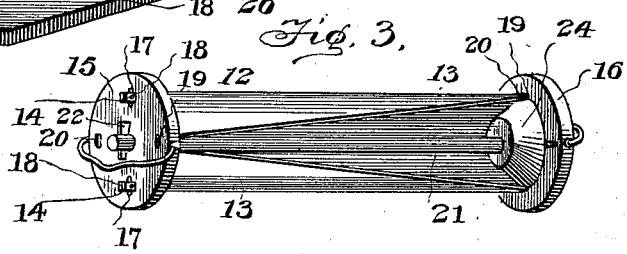
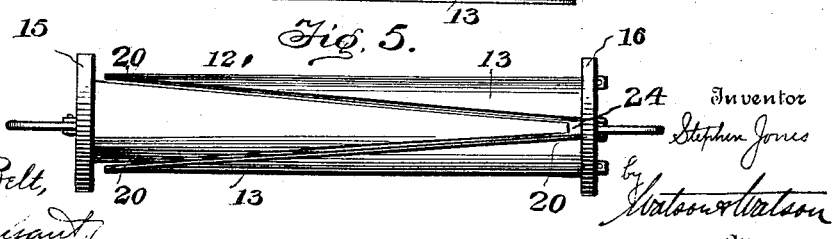
Witnesses  
Fenton S. Pelt,  
Arthur L. Bryant
Inventor  
Stephen Jones  
by  
Watson & Watson  
Attorneys
THE NORRIS PETERS CO., PHOTO-LITHO., WASHINGTON, D. C.

UNITED STATES PATENT OFFICE.

STEPHEN JONES, OF DUNMORE, PENNSYLVANIA.

APPARATUS FOR MOLDING GLASS PIPES.

SPECIFICATION forming part of Letters Patent No. 658,088, dated September 18, 1900.

Application filed December 16, 1899. Serial No. 740,580. (No model.)

*To all whom it may concern:*

Be it known that I, STEPHEN JONES, a citizen of the United States, residing at Dunmore, in the county of Lackawanna and State of Pennsylvania, have invented certain new and useful Improvements in Apparatus for Molding Glass Pipes, of which the following is a specification.

My invention relates to improvements in apparatus for casting glass pipes; and it consists in a simple form of collapsible and separable core and a mold adapted to receive the same.

In the accompanying drawings, which illustrate my invention, Figure 1 is a plan view of the apparatus, the upper part of the mold being thrown back and partly broken away. Fig. 2 is a perspective view of the same with the mold closed. Fig. 3 is a similar view of the core, one of the staves being removed. Fig. 4 is a similar view of one of the staves forming the core, and Fig. 5 is a view of the core with the heads moved apart.

Referring to the drawings, 1 indicates the lower portion of the mold, and 2 and 3 indicate the two parts forming the upper half of the mold, said parts being connected to the lower half by hinges 4. A longitudinal tapering slot 5 is formed in the upper side of the mold, through which the molten glass is to be poured, and the two hinged portions may be locked together by suitable catches 6. An opening 7 is formed at one side of the mold, and within said opening is arranged a threaded rod 8, said rod being supported by a bracket 9, having a threaded opening therein. By means of a crank 10 the rod may be moved through the opening 7, so that its threaded end 11 may be extended across the space between the interior of the mold and the exterior of the core 12, and by reversing the movement of the crank the end of the rod may be withdrawn from the interior of the mold. The rod serves the purpose of a core, by means of which a hole is formed in the side of the pipe into which a tap-pipe may afterward be inserted. Preferably the end 11 of the rod is threaded, as shown, so as to form a threaded opening in the pipe.

The core 12 consists of a series of tapering staves 13, having lugs 14 projecting centrally from their wider ends, and a pair of heads 15 and 16, to which said staves are hinged. As shown, each head is formed with a pair of diametrically-opposite radial slots 17, through which the lugs 14 extend, and said lugs are pivotally secured between projecting blocks 18 upon the outer sides of the heads. The slots are long enough to permit the lugs to swing upon their pivots for a short distance, so that the staves may move radially.

As shown, the staves connected to each head are separated from each other, and slots or openings 19 are formed in the head between the adjacent staves, said slots forming pockets which are adapted to receive the narrow ends 20 of the staves, which are hinged to the opposing head. A rod 21 extends centrally through the heads, and the latter are drawn toward each other by means of a suitable wedge 22, extending through a slot 23 in the end of the rod. When the heads are thus drawn together, it will be seen that the narrow ends of the staves will be forced into the slots or pockets 19 in the opposing heads and that the staves will be wedged together at their edges throughout their length, thus forming a practically-unbroken cylindrical surface.

In order to facilitate the assembling of the two parts of the mold, I provide upon the inner sides of each head a conical or inclined face 24, so that when the parts are brought into the position indicated in Fig. 5 preparatory to locking them together by means of the bolt and the heads are forced toward each other the ends 20 will be spread apart and guided into the pockets 19 by the inclined faces 24. A tapering ring 27 is placed upon one end of the core to form a bell-mouth in the pipe, and when the core is in place this ring rests against the end of the mold. After the core is arranged within the mold the rod 8 is turned so as to force its end 11 into contact with the core. The molten glass is then poured into the mold through the slot 5, and as soon as it becomes partly set the crank 10 is turned to withdraw the rod 8, thus leaving an opening in the side of the pipe. The wedge 22 is then removed, and the heads 15 and 16 are drawn apart by means of rods 25, which engage bails 26, attached to the heads. The movement of the heads away from each other causes the narrow ends of the staves to drop out of the pockets and to fall inwardly, as shown in Fig. 5, thus permitting the glass pipe to shrink without binding upon the core. The two parts of the core are then removed from the opposite ends of the mold, and the completed pipe may be then removed. It will be seen that should any of the molten glass by any possibility run between the staves, the latter, owing to their tapering form, may be drawn apart without breaking the glass or sticking in the mold.

Having described my invention, what I claim, and desire to secure by Letters Patent of the United States, is—

1. A core for glass-molds consisting of two heads separably connected together, each head having hinged thereto a series of tapering staves, the staves connected with one of said heads fitting between the staves connected with the opposing heads to form a cylinder.

2. A core for glass-molds consisting of two heads separably connected together, each head having hinged thereto a series of separated, tapering staves, and having openings or pockets between said staves adapted to receive the narrow ends of the staves connected with the opposing head.

3. A core for glass-molds consisting of two heads separably connected together, each head having hinged thereto a series of separated, tapering staves, and having openings or pockets between said staves adapted to receive the narrow ends of the staves connected with the opposing head, conical or tapering faces upon the heads adjacent to said pockets, and means for adjusting said heads toward each other to force the staves together.

4. A core for glass-molds consisting of two heads each having hinged thereto a series of separated, tapering staves, and having openings or pockets between said staves adapted to receive the narrow ends of the staves connected with the opposing head, conical or tapering faces upon the heads adjacent to said pockets, and a removable bolt securing said heads together.

5. A collapsible core for glass-molds formed in two separable parts, each part consisting of a head and a series of tapering staves hinged thereto, the staves connected with one of said heads fitting between the staves connected with the opposing head to form a cylinder, and means for moving said parts in opposite directions to separate the core.

In testimony whereof I affix my signature in presence of two witnesses.

STEPHEN JONES.

Witnesses:
ROBERT WATSON,
FLORA LEVI.